United States Patent
Faucheux et al.

(10) Patent No.: US 11,152,637 B2
(45) Date of Patent: Oct. 19, 2021

(54) FUEL CELL

(71) Applicant: COMMISSARIAT A L'ENERGIE ATOMIQUE ET AUX ENERGIES ALTERNATIVES, Paris (FR)

(72) Inventors: Vincent Faucheux, Lans en Vercors (FR); Olivier Blanchot, Sassenage (FR); Philippe Capron, Virieu sur Bourbre (FR); Jessica Thery, Saint Jean de Moirans (FR)

(73) Assignee: COMMISSARIAT A L'ENERGIE ATOMIQUE ET AUX ENERGIES ALTERNATIVES, Paris (FR)

(*) Notice: Subject to any disclaimer, the term of this patent is extended or adjusted under 35 U.S.C. 154(b) by 122 days.

(21) Appl. No.: 16/484,947

(22) PCT Filed: Feb. 7, 2018

(86) PCT No.: PCT/EP2018/053005
§ 371 (c)(1),
(2) Date: Aug. 9, 2019

(87) PCT Pub. No.: WO2018/146119
PCT Pub. Date: Aug. 16, 2018

(65) Prior Publication Data
US 2020/0006798 A1 Jan. 2, 2020

(30) Foreign Application Priority Data
Feb. 10, 2017 (FR) .................................... 1751110

(51) Int. Cl.
*H01M 8/2483* (2016.01)
*H01M 8/2457* (2016.01)
(Continued)

(52) U.S. Cl.
CPC ....... *H01M 8/2483* (2016.02); *H01M 8/0273* (2013.01); *H01M 8/04014* (2013.01);
(Continued)

(58) Field of Classification Search
CPC ........... H01M 8/04335; H01M 8/2457; H01M 8/2483
(Continued)

(56) References Cited

U.S. PATENT DOCUMENTS 5,863,671 A * 1/1999 Spear, Jr. ............ H01M 8/0267
429/413
2004/0209136 A1  10/2004 Ren et al.
(Continued)

FOREIGN PATENT DOCUMENTS

DE   112004002695 T5   9/2007
DE   102013108413 A1   2/2015
(Continued)

OTHER PUBLICATIONS

International Search Report (ISR) for PCT/EP2018/053005 dated Jun. 26, 2019 (4 pages).
(Continued)

*Primary Examiner* — James M Erwin
(74) *Attorney, Agent, or Firm* — Shumaker, Loop & Kendrick, LLP

(57) ABSTRACT

A fuel cell including a plurality of elementary modules stacked on each other, at least one of the elementary modules including an oxidation unit generating electrons by oxidation of a fuel with an oxidant, an anode block including a fuel transporter support, for transporting an anode feed flow containing the fuel to an anode chamber, onto which is attached an anode electron collector, a cathode block including an oxidant transporter support, for transporting a cathode feed flow containing the oxidant to a cathode chamber, onto
(Continued)

which is attached a cathode electron collector, the elementary module defining the anode chamber, respectively, the cathode chamber between the oxidation unit and the fuel transporter support, respectively, the oxidant transporter support, and being such that, prior to the assembly of the elementary module in said plurality, the anode block, respectively, the cathode block and the oxidation unit are attached to each other.

18 Claims, 5 Drawing Sheets

(51) Int. Cl.
*H01M 8/0273* (2016.01)
*H01M 8/04014* (2016.01)
*H01M 8/0432* (2016.01)
*H01M 8/04537* (2016.01)
*H01M 8/04746* (2016.01)
*H01M 8/0245* (2016.01)
*H01M 8/0256* (2016.01)

(52) U.S. Cl.
CPC ... *H01M 8/04335* (2013.01); *H01M 8/04641* (2013.01); *H01M 8/04768* (2013.01); *H01M 8/2457* (2016.02); *H01M 8/0245* (2013.01); *H01M 8/0256* (2013.01)

(58) Field of Classification Search
USPC ......................................................... 429/452
See application file for complete search history.

(56) References Cited

U.S. PATENT DOCUMENTS

| | | |
|---|---|---|
| 2005/0095485 A1 | 5/2005 | Saulsbury et al. |
| 2006/0210855 A1* | 9/2006 | Frank .................. H01M 8/2483 429/434 |
| 2006/0257703 A1 | 11/2006 | Qi et al. |
| 2007/0184330 A1 | 8/2007 | McLean et al. |
| 2009/0004542 A1 | 1/2009 | Budinski |
| 2009/0081493 A1 | 3/2009 | Schrooten et al. |
| 2014/0216644 A1 | 8/2014 | Keite-Telgenbuscher |
| 2016/0181634 A1 | 6/2016 | Faucheux et al. |

FOREIGN PATENT DOCUMENTS

| | | |
|---|---|---|
| FR | 3000615 A1 | 5/2005 |
| JP | H08-078040 A | 3/1996 |
| JP | 2010103042 A | 5/2010 |
| JP | 2012-028160 A | 2/2012 |
| WO | 03083977 A2 | 10/2003 |
| WO | 2011079377 A1 | 7/2011 |
| WO | 20130134789 A2 | 9/2013 |

OTHER PUBLICATIONS

International Search Report for PCT/EP2018/053004 dated Mar. 20, 2018 (6 pages).
English translation of JP Office Action for JP Pat. App. No. 2019-543342 drafted Sep. 30, 2020 (8 pages).
Non-Final Office Action for U.S. Appl. No. 16/484,972 dated Mar. 30, 2021 (15 pages).
Notice of Allowance for U.S. Appl. No. 16/484,972 dated Jul. 20, 2021 (8 pages).

* cited by examiner

FUEL CELL

TECHNICAL FIELD AND BACKGROUND

The present invention relates to an elementary module of a fuel cell and also to a fuel cell including at least one elementary module.

Two main types of fuel cells are known for generating an electric current by oxidation of a fuel, generally of dihydrogen, with an oxidant, generally dioxygen.

A first group of cells is formed from "planar" cells as described in FR 3 000 615 A1 and WO 2011/079377 A1. Such fuel cells are slim, their lengths and widths being large relative to their respective thicknesses. They are generally fed with dioxygen by natural convection and their power is low, limited to a maximum of 100 W.

A second group of cells is constituted by cells including a plurality of thin elementary modules each extending in a longitudinal direction, stacked on top of each other and electrically connected in series. Each elementary module includes an oxidation unit formed from an anode and a cathode sandwiching an electrolytic membrane, the oxidation unit itself being sandwiched between bipolar plates which ensure, firstly, the feeding of the cathode of an elementary module with a flow containing the oxidant and the feeding of the anode of the contiguous elementary module with a flow containing the fuel, and, secondly, the electrical connection of the oxidation units, acting as anode and cathode electron collectors. In order to reduce the contact electrical resistances between the oxidation units and the bipolar plates, and to ensure the fuel leaktightness, the bipolar plates are pressed against the oxidation units, conventionally by means of compression tie rods connected to end plates sandwiching all of the elementary modules, for example as described in US 2005/0095485 A1. As a variant, WO 2013/134789 A1 describes a fuel cell including a compression belt surrounding and compressing an assembly constituted of two end plates sandwiching a stack of elementary modules. WO 03/083977 A1 describes a fuel cell including a stack of elementary modules housed in a case including a box and a lid to close the box, the height of the housing being less than the height of the stack before closure of the case. The box and the lid bear complementary reliefs, such that by click-fastening the lid onto the box, a compression is applied to the stack.

However, to ensure the compression of the stack of elementary modules in the fuel cells of the prior art, it proves to be necessary to use heavy elements, such as end plates or a case, thus reducing the power density per unit mass of the cell, which is defined as the ratio of the power that is able to be generated by the cell to the mass of the cell. Moreover, the bipolar plates used in the cells of the prior art generally have complex shapes, necessitating numerous complex and expensive manufacturing steps.

SUMMARY

There is thus a need for a fuel cell that can overcome the drawbacks mentioned previously.

To this end, the invention proposes, according to a first of its aspects, an elementary module that is useful for a fuel cell, the elementary module including:
- an oxidation unit configured to generate electrons by means of the oxidation of a fuel, preferably of dihydrogen, with an oxidant, preferably dioxygen, the oxidation unit including an anode and a cathode sandwiching an electrolytic membrane,
- an anode block including a fuel transporter support suitable for transporting an anode feed flow containing the fuel to an anode chamber, and an anode electron collector attached to the fuel transporter support,
- an oxidant transporter support suitable for transporting a cathode feed flow containing the oxidant to a cathode chamber, and a cathode electron collector attached to the oxidant transporter support, the elementary module being configured so as to define the anode chamber, respectively, the cathode chamber, between the oxidation unit and the fuel transporter support, respectively, the oxidant transporter support, the anode electron collector, respectively, the cathode electron collector, and the oxidation unit being both attached by bonding and electrically connected to each other by means of an anode conductive bridge, respectively, a cathode conductive bridge, containing an electrically conductive adhesive.

Advantageously, a cell including at least one elementary module according to the first aspect of the invention does not require any compression means such as those of the prior art to ensure a good electrical connection between the anode and the anode electron collector, on the one hand, and between the cathode and the cathode electron collector, on the other hand. In particular, the anode and cathode conductive bridges provide a perfect electrical contact between the anode electron collectors and cathode electron collector, respectively, and the oxidation unit. The elementary module according to the invention thus has a low total electrical resistance without application of external compression. This low total resistance is partly linked to the low contact resistances internal to the elementary module. In addition, the anode and cathode conductive bridges provide, at least partially, or even entirely, the mechanical strength of the elementary module, by rigidly connecting the anode and cathode blocks to the electrolysis unit. Moreover, the total mass of the anode and cathode conductive bridges is low with respect to the mass of the means required to ensure the compression of a cell of the same volume and including the same number of elementary modules as a cell of the prior art. Thus, a cell including an elementary module according to the first aspect of the invention has a higher power density per unit mass.

Moreover, the oxidation unit and the fuel transporter support may be both attached by bonding to each other and electrically insulated from each other by means of an anode leakproofing bridge containing a fuel-leaktight electrically insulating adhesive,
- the anode leakproofing bridge being configured so that the anode feed flow transported to the anode chamber flows essentially from the fuel transporter support directly to the anode. Besides the leaktightness that it ensures, as will emerge more clearly hereinbelow, the anode leakproofing bridge may advantageously participate in the mechanical strength of the elementary module.

According to a second of its aspects, the invention also relates to an elementary module that is useful for a fuel cell, the elementary module including:
- an oxidation unit configured to generate electrons by means of the oxidation of a fuel, preferably of dihydrogen, with an oxidant, preferably dioxygen, the oxidation unit including an anode,
- a fuel transporter support that is suitable for transporting an anode feed flow including the fuel to an anode chamber, the module being configured so as to define said anode chamber between the anode and the fuel transporter support, the oxidation unit and the fuel transporter support being both attached by bonding to each other and electrically insulated from each other by means of an anode leakproofing bridge containing a fuel-leaktight electrically insulating adhesive, the anode leakproofing bridge being configured so that when the anode feed flow is transported to the anode chamber by the fuel transporter support, said anode feed flow flows essentially from the fuel transporter support directly to the anode.

Advantageously, a cell including at least one elementary module according to the second aspect of the invention does not require any compression means such as those of the prior art to ensure the leaktightness of the fuel cell. In particular, the anode leakproofing bridge ensures that the fuel entering the anode chamber by means of the fuel transporter support reaches the anode while ensuring that it does not leak out of the anode chamber. Moreover, within a fuel cell including a plurality of elementary modules according to the second aspect of the invention, the total mass of the anode leakproofing bridges is low with respect to the mass of the means required to ensure the compression of a cell of the same volume and including the same number of elementary modules as a cell of the prior art. For a mass identical to that of a cell of the prior art, a cell including at least one elementary module according to the second aspect of the invention thus has a higher power density per unit mass.

In addition, the oxidation unit may include an electrolytic membrane in contact with the anode, the anode being placed between the anode chamber and the electrolytic membrane, and optionally an anode collecting layer in contact with one face of the anode placed facing the anode chamber.

Moreover, the elementary module may include a cathode block including an oxidant transporter support that is suitable for introducing a cathode feed flow containing the oxidant into a cathode chamber, the oxidation unit including a cathode placed in contact with the electrolytic membrane, the electrolytic membrane being sandwiched between the anode and the cathode, the module being configured so as to define said cathode chamber between the cathode and the oxidant transporter support, the oxidation unit and the oxidant transporter support being both attached by bonding to each other and electrically insulated from each other by means of a cathode attachment bridge containing an electrically insulating adhesive.

The elementary module may include an anode block including the anode electron collector attached to the fuel transporter support, and the cathode block may include a cathode electron collector attached to the oxidant transporter support, the anode electron collector, respectively, the cathode electron collector and the oxidation unit being both attached by bonding and electrically connected to each other by means of an anode conductive bridge, respectively, a cathode conductive bridge, containing an electrically conductive adhesive.

The invention also relates to a fuel cell including an elementary module according to either of the first and second aspects of the invention, or a plurality of elementary modules stacked on top of each other in a stacking direction, at least one, preferably all, of the elementary modules of the plurality each being according to either of the first and/or second aspects of the invention.

The invention relates to a fuel cell including a plurality of elementary modules stacked on top of each other in a stacking direction, at least one, preferably all, of the elementary modules of the plurality including:

an oxidation unit configured to generate electrons by means of the oxidation of a fuel, preferably of dihydrogen, with an oxidant, preferably dioxygen, the oxidation unit including an anode and a cathode sandwiching an electrolytic membrane, an anode block including a fuel transporter support suitable for transporting an anode feed flow containing the fuel to an anode chamber, and an anode electron collector attached to the fuel transporter support, a cathode block including an oxidant transporter support suitable for transporting a cathode feed flow containing the oxidant to a cathode chamber, and a cathode electron collector attached to the oxidant transporter support, the at least one elementary module being configured so as to define the anode chamber, respectively, the cathode chamber, between the oxidation unit and the fuel transporter support, respectively, the oxidant transporter support, the anode block, respectively, the cathode block and the oxidation unit being attached to each other, and/or the at least one elementary module being such that, prior to the assembly of the at least one elementary module in the plurality of elementary modules of the fuel cell, the anode block, respectively, the cathode block and the oxidation unit are attached to each other.

The fuel cell according to the invention does not require any compression means to ensure the electrical connection between the elementary modules and the fuel-leaktightness of each elementary module. It thus has a power density per unit mass that is higher than that of a fuel cell of the same mass of the prior art.

Moreover, since an elementary module of the fuel cell is not compressed by an external force other than the potential weight of other elementary modules placed vertically above said elementary module, said elementary module is easy to change in the case where said elementary module is defective. Notably, as will emerge more clearly hereinbelow, two consecutive elementary modules may be separated from each other in the stacking direction. The elementary module may thus be easily extracted from the fuel cell by sliding it in a transverse direction with respect to the stacking direction. The elementary module may be removable. For the purposes of the present invention, it is considered that two members, for example the anode block or the cathode block, on the one hand, and the oxidation unit, on the other hand, are attached to each other when another member rigidly connects said two members. For example, said other member is an adhesive bridge, a screw or a rivet. On the contrary, for example, the assembly of two parallel plates held together by the application of a compression force normal to their faces does not define an attachment for the purposes of the invention, since the plates may notably be moved relative to each other when the compression force is taken away.

Preferably, the anode block, respectively, the cathode block and the oxidation unit are attached to each other by means of an attachment member placed, at least partially, or even entirely, between the anode block, respectively, the cathode block and the oxidation unit.

The attachment member may include, or even may be constituted by, an electrically conductive or electrically insulating adhesive.

The attachment member may be attached via at least one of its faces to the anode block, respectively, to the cathode block and to the oxidation unit. Preferably, it is attached, via two of its faces which are opposite each other, to the anode block, respectively, to the cathode block and to the oxidation unit.

The attachment member may be placed between the anode block, respectively, the cathode block, and the oxidation unit and may include an electrically conductive adhesive, so as to define an anode conductive bridge, respectively, a cathode conductive bridge.

The attachment member may be placed between the cathode block and the oxidation unit and may include an electrically insulating adhesive, so as to define a cathode attachment bridge.

The attachment member may be placed between the anode block and the oxidation unit and may include an electrically insulating adhesive, so as to define an anode leakproofing bridge.

Preferably, the anode block, respectively, the cathode block and the oxidation unit are attached by bonding and electrically connected to each other by means of an anode conductive bridge, respectively, a cathode conductive bridge, containing an electrically conductive adhesive.

Preferably, the anode block, respectively, the cathode block includes an anode electron collector attached to the fuel transporter support, respectively, a cathode electron collector attached to the oxidant transporter support, the anode conductive bridge and the anode electron collector, respectively, the cathode conductive bridge and the cathode electron collector being both attached by bonding and electrically connected to each other.

Preferably, the oxidation unit and the fuel transporter support are both attached by bonding to each other and electrically insulated from each other by means of an anode leakproofing bridge containing a fuel-leaktight electrically insulating adhesive, the anode leakproofing bridge being configured such that the anode feed flow transported to the anode chamber flows essentially directly from the fuel transporter support to the anode.

Finally, the invention relates to apparatus, notably chosen from a flying object, for example a drone, a bicycle and an electric generator, for example a charger for electrically recharging a set of mobile devices, said apparatus including a fuel cell according to the invention.

The elementary module and the fuel cell according to any of the aspects of the invention described above may also include one or more of the features described hereinbelow.

Preferably, the elementary module is "planar", i.e. it generally extends in a longitudinal plane. A planar elementary module is particularly suitable for forming a fuel cell stack. In particular, the elementary module may be "slim", i.e. its thickness, defined as being the mean value of the distances, measured in a direction transverse to the longitudinal plane, between two opposite longitudinal outer faces of the elementary module, is at least 50 times smaller and preferably at least 2500 times smaller than the length of the elementary module, measured in the longitudinal plane.

In particular, the length and/or width and/or thickness of the elementary module may be, respectively, between 10 mm and 500 mm, between 10 mm and 500 mm, and between 0.2 mm and 2 mm. Preferably, the opposite longitudinal outer faces of the elementary module are parallel.

Moreover, when the oxidation block is fed with fuel and with oxidant, the electrons generated by the oxidation unit on the faces of the anodes and cathodes that are opposite the respective faces facing the membrane, referred to as the anode electrons and cathode electrons, respectively, transit via the anode electron collector and via the cathode electron collector, respectively. To collect more anode electrons and/or cathode electrons and thus improve the energy yield of the elementary module, the oxidation unit preferably includes an anode collecting layer, placed on the face of the anode that is opposite the face of the anode facing the electrolytic membrane, and/or a cathode collecting layer, placed on the face of the cathode that is opposite the face facing the electrolytic membrane.

Preferably, the anode collecting layer, respectively, the cathode collecting layer is separated from the fuel transporter support, respectively, from the oxidant transporter support by the anode chamber, respectively, by the cathode chamber.

The anode collecting layer and/or the cathode collecting layer may be in the form of a thin film, preferably with a thickness of less than 100 μm, which is porous so as to allow the anode feed flow to reach the anode, respectively, to allow the cathode feed flow to reach the cathode. The anode collecting layer and/or the cathode collecting layer may be deposited, respectively, on the face of the anode and/or on the face of the cathode by 3D printing or by vacuum deposition, for example chemical vapor deposition, or physical vapor deposition. Preferably, the anode collecting layer and/or the cathode collecting layer are formed from a metal, preferably from gold.

In particular, the anode collecting layer may occupy between 50% and 100% of the area of the face of the anode which it covers and/or the cathode collecting layer may occupy between 50% and 100% of the area of the face of the cathode which it covers.

As regards the anode and cathode conductive bridges, they allow, respectively, the transfer of the anode electrons from the anode to the anode electron collector, and of the cathode electrons from the cathode to the cathode electron collector.

In particular, the anode conductive bridge may be attached by bonding to the anode and/or to the anode collecting layer and/or to the electrolytic membrane. For its part, the cathode conductive bridge may be attached by bonding to the cathode and/or to the cathode collecting layer and/or to the electrolytic membrane.

The anode conductive bridge may be placed between the anode and the fuel transporter support so as to partially define the anode chamber, and in particular at least partially, or even totally, a wall of said anode chamber, notably extending in a transverse direction. For its part, the cathode conductive bridge may be placed between the cathode and the oxidant transporter support so as to partially define the cathode chamber, and in particular at least partially, or even totally, a wall of said cathode chamber, notably extending in a transverse direction.

Preferably, the anode conductive bridge is sandwiched between the oxidation block and the anode electron collector and/or the cathode conductive bridge is sandwiched between the oxidation block and the cathode electron collector.

Preferably, the anode conductive bridge and/or the cathode conductive bridge at least partially, or even entirely, cover the anode electron collector and/or the cathode electron collector, respectively. In this way, the electron transfer between the anode and the anode electron collector and/or between the cathode and the cathode electron collector is optimal.

The anode conductive bridge and/or the cathode conductive bridge may be in various forms. They may each be in the form of at least one stud or of at least one continuous or discontinuous strip, or of at least one surface extending in two perpendicular directions.

The studs or strips may form a regular or even periodic pattern. For example, the studs may be arranged in a network formed by the periodic repetition in two perpendicular directions of a square pattern, and at each apex of one of the patterns of the network. A stud may be in the form of a right prism, notably with a square or rectangular base, or in an axisymmetric cylindrical form. The diameter of the stud, corresponding to the longest length in a direction perpendicular to the generatrix of the prism, may be between 0.1 mm and 10 mm. In the variant in which the anode conductive bridge and/or the cathode conductive bridge are in the form of at least one strip, preferably, the width of at least one, preferably of each, of the strips is between 0.1 mm and 10 mm.

In particular, the ratio of the area of the projection of the anode conductive bridge to the area of the projection of the fuel transporter support may be between 1% and 50% and/or the ratio of the area of the projection of the cathode conductive bridge to the area of the projection of the fuel transporter support may be between 1% and 50%, said projections being made on the longitudinal plane on which extends the elemental module and in a transverse direction with respect to said longitudinal plane.

The anode conductive bridge and/or the cathode conductive bridge may have a thickness of between 1 μm and 100 μm. In particular, the anode conductive bridge may project from the face of the anode on which it is placed and/or the cathode conductive bridge may project from the face of the cathode on which it is placed.

Moreover, in the variant in which the anode conductive bridge, respectively, the cathode conductive bridge is in the form of at least one discontinuous strip, the space defined between the two portions of the strip and extending between planes parallel to the side faces of the strip may be at least partially, or even totally, filled with an anode insulating bridge, respectively, a cathode insulating bridge. The anode conductive bridge and the anode insulating bridge may at least partially define a transverse wall of the anode chamber, for example entirely surrounding the anode chamber, and/or the cathode conductive bridge and the cathode insulating bridge may at least partially define a transverse wall of the cathode chamber, for example entirely surrounding the cathode chamber.

The anode conductive bridge and/or the cathode conductive bridge may be formed on the anode block and/or on the cathode block, respectively, or on the oxidation unit by printing with a glue including the electrically conductive adhesive, for example by screen printing, by spraying or by dispensing.

The anode conductive bridge and the cathode conductive bridge each contain an electrically conductive adhesive.

The electrically conductive adhesive may notably have anisotropic conductivity. Preferably, the anode conductive bridge, respectively, the cathode conductive bridge is such that the direction of greatest electrical conductivity of the electrically conductive adhesive is parallel to the direction normal to the thickness of the anode conductive bridge, respectively, of the cathode conductive bridge.

Preferably, the electrically conductive adhesive includes, or even consists of, a polymer resin in which are dispersed carbon particles, for example in the form of graphene, and/or metal particles. Preferably, the metal particles comprise, or even consist of, a metal chosen from silver, gold and alloys thereof, or are formed from a metal core, preferably made of a metal chosen from copper and nickel and alloys thereof, covered with a carbon coating or a metal coating, preferably made of a metal chosen from gold, silver and alloys thereof.

In particular, the electrically conductive adhesive of the anode conductive bridge may be identical to or different from the electrically conductive adhesive of the cathode conductive bridge.

For example, by way of illustration, the adhesive may be Le TRA-DUCT 2902 sold by the company Tra-Con.

For its part, the oxidation unit is preferably placed between the anode block and the cathode block.

Preferably, the oxidation unit extends in a plane parallel to or coincident with the longitudinal plane. In particular, the oxidation unit may be in the form of a composite plate and/or each of the anode, cathode and electrolytic membrane may be in the form of a plate extending in a plane parallel to the longitudinal plane.

In particular, the thickness of the oxidation unit may be greater than or equal to 0.01 mm and/or less than or equal to 0.5 mm.

Preferably, the anode and/or the cathode are attached to the electrolytic membrane, for example by drying of an ink deposited by spraying onto the anode, respectively, the cathode and/or the membrane, and containing catalysts based on platinized carbon (C/Pt).

The anode may include, or even may consist of, a mixture of C/Pt and of Nafion, and/or the membrane may be at least partially, or even totally, formed from Nafion, and/or the cathode may include, or even may consist of, a mixture of C/Pt and of Nafion.

Moreover, as regards the fuel transporter support and the oxidant transporter support, preferably at least one of them, preferably both of them, extend in a plane parallel to the longitudinal plane.

Preferably, the fuel transporter support and/or the oxidant transporter support may each be in the form of a plate. Such fuel transporter supports and/or oxidant transporter support are thus easy, quick and inexpensive to manufacture.

The fuel transporter support and the oxidant transporter support are configured to introduce, respectively, the anode feed flow containing the fuel into the anode chamber and the cathode feed flow containing the oxidant into the cathode chamber. Preferably, the oxidant transporter support, respectively, the fuel transporter support is porous, so that the fuel and the oxidant can entirely pass through the fuel transporter support, respectively, the oxidant transporter support. To this end, the fuel transporter support and/or the oxidant transporter support may include holes, for example piercings, which pass through the fuel transporter support and/or the oxidant transporter support, respectively, in their respective thicknesses. As a variant, the fuel transporter support and/or the oxidant transporter support may each be in the form of a foam having an open and percolating porosity at least in the direction of its thickness. In this way, the anode feed flow and/or the cathode feed flow can flow in the thickness of the fuel transporter support and/or of the oxidant transporter support, respectively.

Preferably, the fuel transporter support and/or the oxidant transporter support are made of an electrically insulating material.

The fuel transporter support and the oxidant transporter support may include, or even may consist of, a polymer material, for example a thermoplastic, notably chosen from polyethylene terephthalate PET, polyethylene PE, polycarbonate PC, FR4, Kapton, and mixtures thereof.

In one variant, the fuel transporter support and/or the oxidant transporter support may be in the form of a flat grate. Preferably, the face of the grate which is facing the anode chamber, respectively, the cathode chamber is at least partially, or even, preferably, entirely covered with an assembly formed from an electrically insulating film and an electrically conductive metal film defining the anode electron collector, respectively, the cathode electron collector. Preferably, the electrically insulating film and, optionally, the electrically conductive film, is porous, so as to allow the transportation of the fuel or of the oxidant in its thickness. Preferably, the thickness of the electrically insulating film and/or the thickness of the electrically conductive film is between 10 µm and 500 µm. Preferably, the electrically conductive film and the electrically insulating film cover different portions, which are preferably not superposed, of the face of the grate that is facing the anode chamber, respectively, the cathode chamber. For example, the anode conductive bridge is attached by bonding to the electrically conductive film of the fuel transporter support forming the anode electron collector and the cathode conductive bridge is attached by bonding to the electrically conductive film of the oxidant transporter support forming the cathode electron collector. Preferably, the anode conductive bridge and/or the cathode conductive bridge are placed at a distance from the electrically insulating conductive film of the fuel transporter support, respectively, of the oxidant transporter support.

As described previously, an anode electron collector and a cathode electron collector are attached, preferably by bonding, to the fuel transporter support and to the oxidant transporter support, respectively. At least one end of the anode electron collector, respectively, of the cathode electron collector may project, for example laterally, from the elementary module, and may be electrically connected to a recontacting connector, to connect the elementary module to an electrical appliance or to another elementary module, for example the consecutive elementary module of the stack of elementary modules of a fuel cell including a plurality of elementary modules.

In one embodiment, the anode electron collector may be printed onto the fuel transporter support and/or the cathode electron collector may be printed onto the oxidant transporter support, thus forming an anode block, respectively, a cathode block. The anode block and/or the cathode block thus formed are then in the form of printed circuits, which facilitates the manufacture of the elementary module, and notably the relative positioning of said fuel and oxidant transporter supports relative to the oxidation unit during the assembly of the constituent elements of the elementary module.

Preferably, the anode electron collector and/or the cathode electron collector are at least partially in the form of strips spaced apart from each other, preferably forming a regular or even periodic pattern, for example a grid. For example, the strip(s) extend laterally in the longitudinal plane, and notably between two opposite side faces of the elementary module.

Moreover, the ratio R of the area $S_A$ of the projection of the anode electron collector to the area S of the projection of the fuel transporter support is preferably between 0.01 and 0.50, and/or the ratio R' of the area $S'_A$ of the projection of the cathode electron collector to the area S' of the projection of the fuel transporter support is between 0.01 and 0.50, said projections being made on the longitudinal plane and in a transverse direction relative to said longitudinal plane. The ratios R and R' may be identical or different.

Thus, the contact resistance between the anode electron collector and/or the cathode electron collector, on the one hand, and the oxidation unit, on the other hand, is reduced.

Preferably, the anode electron collector, respectively, the cathode electron collector projects, preferably in a transverse direction, from the face of the fuel transporter support, respectively to the thickness of the oxidant transporter support onto which it is attached, the height of said projection being, for example, equal to the thickness of said anode electron collector, respectively, of the cathode electron collector. The anode electron collector, respectively, the cathode electron collector thus at least partially defines a spacer separating the fuel transporter support, respectively, the oxidant transporter support from the oxidation unit, said spacer partially defining the anode chamber, respectively, the cathode chamber.

Preferably, the thickness of the anode electron collector and/or the thickness of the cathode electron collector is less than 100 µm.

The anode electron collector and/or the cathode electron collector are preferably metallic, and may notably include, for more than 99.0% of their mass, carbon and/or a metal chosen from silver, tantalum, molybdenum, copper and alloys thereof. Such a metal or alloy readily conducts the electrons collected on the anode and cathode. In one variant, the anode electron collector and/or the cathode electron collector may include a layer formed from said metal, attached to the fuel transporter support, respectively, to the oxidant transporter support, covered with a protective and conductive film formed from another metal or with a superposition of layers, each layer being made of a metal different from that of the other layers of the film, said film possibly having a thickness of less than 10 µm.

Moreover, as has been described previously, the elementary module may include an anode insulating bridge and/or a cathode insulating bridge, the cathode insulating bridge being formed from at least one electrically insulating material. Preferably, the anode insulating bridge is placed between the oxidation unit and the anode electron collector. It may be in direct contact with the oxidation unit and with the anode electron collector. Preferably, the cathode insulating bridge is placed between the oxidation unit and the cathode electron collector. It may be in direct contact with the oxidation unit and with the cathode electron collector.

Preferably, the anode insulating bridge and/or the cathode insulating bridge are in the form of a thin film, for example having a thickness of between 1 µm and 100 µm. Preferably, the anode insulating bridge and/or the cathode insulating bridge are placed, respectively, on a portion of the face of the anode electron collector facing the oxidation unit and/or on a portion of the face of the cathode electron collector facing the oxidation unit, said portion(s) being different from portions covered with the anode conductive bridge and/or with the cathode conductive bridge. The anode insulating bridge, respectively, the cathode insulating bridge thus protects the portion of the face of the anode electron collector, respectively, of the cathode electron collector, which is not covered with the anode conductive bridge, respectively, with the cathode conductive bridge.

Notably, the anode insulating bridge and/or the cathode insulating bridge may be in the form of one or more interrupted strips, studs, notably forming a regular pattern, such as a grid.

For its part, the anode chamber, respectively, the cathode chamber is preferably placed between the fuel transporter support, respectively, the oxidant transporter support, and the oxidation unit.

Preferably, the anode chamber and/or the cathode chamber extend in a plane parallel to the longitudinal plane. Preferably, the anode chamber is at least partially or even entirely defined by:

the outer face of the anode opposite the face that is in contact with the electrolytic membrane, and preferably extending in a plane parallel to the longitudinal plane, the face of the fuel transporter support that is facing the outer face of the anode, and preferably extending in a plane parallel to the longitudinal plane, and the anode leakproofing bridge.

The anode chamber is configured such that when it is fed with fuel, the fuel pressure in the chamber is greater than the atmospheric pressure, which makes it possible to ensure an efficient oxidation reaction of the fuel in the oxidation unit.

Preferably, the anode leakproofing bridge defines a fuel-leaktight seal extending transversely relative to the longitudinal plane between the anode block and the oxidation unit and surrounding, preferably entirely, the anode chamber in a plane parallel to the longitudinal plane. In this way, the anode leakproofing bridge reduces the fuel leaks out of the anode chamber by flow of the fluid in directions contained in the longitudinal plane.

Preferably, the anode conductive bridge and/or the anode leakproofing bridge are configured so as to avoid detachment of the oxidation unit from the anode block, when the fuel pressure is between 0.1 bar and 5 bar. A person skilled in the art readily knows how to determine the properties of the fuel-leaktight electrically insulating adhesive and/or of the electrically conductive adhesive and to define the dimensions of the anode conductive bridge and/or of the anode leakproofing bridge for this purpose.

Preferably, the anode leakproofing bridge is attached by bonding to the anode and/or to the anode collecting layer and/or to the electrolytic membrane. The anode leakproofing bridge may notably be obtained by printing with a glue including the fuel-leaktight electrically insulating adhesive, notably by screen printing, or spraying or dispensing or applying an adhesive film.

The fuel-leaktight electrically insulating adhesive may notably be chosen from polyurethane-type or epoxy-type adhesives. For example, it may be the glue IRS 2125 sold by the company Intertronics.

The anode leakproofing bridge may be in various forms. It is preferably in the form of a continuous strip, which is preferably closed on itself and in contact with each of the opposite longitudinal faces of the anode chamber.

Moreover, the elementary module may include a reservoir having an internal volume for containing the fuel, the anode chamber being in fluid communication with the internal volume of the reservoir by means of the fuel transporter support. Thus, the reservoir defines a fuel reserve for ensuring the feeding of fuel to the anode chamber.

Preferably, the fuel transporter support defines a wall of the reservoir. In one embodiment, the reservoir and the fuel transporter support may form a monolithic block.

Preferably, the reservoir includes a filling orifice configured to be connected, for example by means of a pipe, to a fuel feed pump or to a fuel generating cartridge, for example to a cartridge for generating dihydrogen by hydrolysis of hydrides. Preferably, in the configuration of the elementary module in which the filling orifice is hermetically closed, the assembly formed by the internal volume of the reservoir and the volume of the anode chamber is hermetically closed and fuel-leaktight.

For their part, in one embodiment, the oxidant transporter support and the oxidation unit may be both attached by bonding to each other and electrically insulated from each other by means of a cathode attachment bridge containing an electrically insulating adhesive. The electrically insulating adhesive of the cathode attachment bridge may be identical to or different from the electrically insulating adhesive of the anode leakproofing bridge.

Thus, the cathode attachment bridges and/or cathode conductive bridge ensure at least partially, preferably entirely, the mechanical strength of the connection between the oxidant transporter support and the electrolysis unit.

Moreover, preferably, the cathode attachment bridge may define a transverse wall of the cathode chamber, which may be closed on itself so as to define an oxidant-leaktight seal, or, on the contrary, may have apertures, so as to facilitate the flow of the oxidant out of or into the cathode chamber.

Moreover, the elementary module may include a plurality of electrolysis units sharing the same electrolytic membrane and preferably being placed in a planar arrangement. As a variant, it may include a single electrolysis unit.

The elementary module may also include a gas diffusion layer, preferably placed on a face of the oxidant transporter support opposite the face that is facing the anode chamber, and covered with a porous grate. The gas diffusion layer and the grate participate in maintaining a level of humidity suitable for generating electricity. The gas diffusion layer may be electrically insulating or, on the contrary, may be electrically conductive. It may be hydrophilic or, on the contrary, hydrophobic. The porous grate may be metallic, and optionally covered with an electrically insulating material, or may be made of plastic.

The elementary module may be configured to generate an electric power of between 1 W and 500 W.

The mass of the elementary module may be between 1 g and 1000 g.

As regards the fuel cell, preferably, each elementary module of the plurality of modules extends in an oblique longitudinal plane, which is preferably perpendicular to the stacking direction.

The elementary modules of the cell may be electrically connected together in series or in parallel.

The cell may include at least two, at least 10, at least 20 elementary modules.

Preferably, the fuel cell is free of means for compressing the plurality of elementary modules. In particular, the fuel cell may be free of end plates placed at the opposite ends of the stack and notably connected by at least one compression member.

For example, the stack may include a chassis in the form of a shelf including a plurality of pigeonholes placed one after the other in the stacking direction, each pigeonhole extending in a transverse plane with respect to the stacking direction. Preferably, at least one or even, preferably, several pigeonholes are configured to each house at least one elementary module. In particular, at least two consecutive modules of the stack may be separated from each other. In this way, the elementary modules of the stack are not resting on each other, the weight of each elementary module being supported by the chassis. Replacing a defective elementary module is thus facilitated.

In one embodiment, the elementary modules may be spaced apart from each other in the stacking direction, in a regular, notably periodic, manner.

Moreover, preferably, at least two consecutive modules of the stack are placed head to tail in the stacking direction. As will be detailed hereinbelow, this arrangement makes it possible to limit the number of members required to feed the stack of elementary modules with fuel and/or with oxidant.

Moreover, the cell may include at least one means for generating the oxidant feed flow, and optionally a means for generating the fuel feed flow, so as to ensure the generation of electrical energy by the at least one elementary module. It may also include at least one means, for example a fan, for generating a cooling flow, so as to recover by convective exchange the heat generated by the at least one elementary module during the oxidation reaction of the fuel.

Preferably, the cell is configured to define at least one cathode feed channel configured to transport the cathode feed flow containing the oxidant to at least one elementary module, and/or at least one cooling channel configured to transport a cooling flow including a heat transfer fluid, preferably air, so as to exchange heat by convection with the at least one elementary module.

In particular, the cathode feed channel and/or the cooling channel may have a tubular shape, extending in a direction contained in a plane parallel to the longitudinal planes along which extend the elementary modules between which is placed the cathode feed channel and/or the cooling channel, respectively. Preferably, the cathode feed channel is defined by two side faces, which are preferably parallel to the stacking direction, opposite the cell and by the side faces facing the elementary modules between which said channel is placed. The pressure loss associated with the tubular shape of the cathode feed channel and/or of the cooling channel is low and the fuel cell may be free of means for generating the cathode feed flow and/or the cooling flow, respectively.

As a variant, the cathode feed channel and/or the cooling channel may have a form including a plurality of tube portions connected via bent portions. The tube portions may, for example, run to and fro between the opposite side faces of the cell. Such bent forms notably promote the heat exchange in the cooling channel. As a variant, the cathode feed channel and/or the cooling channel may each be formed from a plurality of coils extending between the inlet and outlet apertures of said cathode feed channel and/or of said cooling channel, respectively, the coils being parallel to each other. In another variant, the cathode feed channel is formed from a plurality of tubes, two neighboring tubes sharing a common wall. In particular, the tubes of the plurality may be parallel to each other and may be placed between the faces that are facing two consecutive elementary modules. Such forms of cathode feed channel and/or of cooling channel promote the feeding of oxidant and/or the heat exchange, respectively. Preferably, to compensate for the pressure loss associated with the presence of multiple internal walls and/or bends in the cathode feed channel and/or in the cooling channel, the fuel cell may include a cathode feed flow generator and/or a cooling flow generator, respectively, preferably including a compressor.

In particular, the cooling flow generator and/or the cathode feed flow generator may be chosen from a fan, notably an axial or radial fan, a turbine and a compressor.

In the preferred variant in which the oxidant is dioxygen, the cathode feed flow is preferably a flow of air. In particular, the cooling flow generator and/or the cathode feed flow generator may function by extracting or blowing air, in a continuous regime or in pulse width modulation (PWM) mode.

Moreover, the cell may include one or more cooling flow generators and/or one or more cathode feed flow generators. For example, the fuel cell may include a plurality of cooling flow generators such that each of the generators of the plurality feeds a single couple formed from two elementary modules.

Preferably, the at least one elementary module is placed between the cathode feed channel and the cooling channel. Preferably, the cathode feed channel extends in an oblique extension direction, preferably orthogonal to the extension direction in which extends the cooling channel. Preferably, the planes in which generally extend the cathode feed channel and the cooling channel are different and parallel, and preferably perpendicular to the stacking direction.

Preferably, the cathode feed channel has at least one inlet aperture, respectively, at least one outlet aperture, for the cell inlet, respectively, outlet flow of the cathode feed flow, and the cooling channel has at least one inlet aperture, respectively, at least one outlet aperture, for the cell inlet, respectively, outlet flow of the cooling flow, the inlet apertures and outlet apertures of said cathode feed channels and cooling channels being configured so that the cell inlet and outlet cathode feed flows flow in at least one oblique, preferably perpendicular, direction with respect to the at least one direction of flow of the cell inlet and outlet cooling flows.

Preferably, the inlet apertures and outlet apertures of said cathode feed channel and cooling channel are configured so that the direction(s) of flow of the cell inlet and outlet cathode feed flows and the direction(s) of flow of the cooling flows are contained in different and parallel planes, which are preferably perpendicular to the stacking direction.

Via any one of the features described in the three immediately preceding paragraphs, the risks of interaction between the cathode feed flow and the cooling flow, which may have a negative impact on the energy yield of the cell, are thus limited.

The inlet apertures and outlet apertures of said cathode feed channel and cooling channel may have various shapes. For example, they have a circular, rectangular, square or oval contour.

Moreover, the cooling channel and/or the cathode feed channel may have several inlet apertures and/or several outlet apertures.

The shape and/or sizes of the inlet aperture of the cooling channel may be identical to or different from the shape and/or sizes of the outlet aperture of the cooling channel. The shape and/or sizes of the inlet aperture of the cathode feed channel may be identical to or different from the shape and/or sizes of the outlet aperture of the cathode feed channel.

The shape and/or sizes of the inlet and outlet apertures of the cooling channel may be identical to or different from the shape and/or sizes of the inlet and outlet apertures of the cathode feed channel.

Moreover, the cathode feed channel may be placed between the respective cathode blocks of at least two consecutive elementary modules of the plurality of elementary modules in the stacking direction, and may be configured to transport the cathode feed flow to the oxidant transporter support of each of said two respective elementary modules, and/or the cooling channel may be placed between at least two consecutive elementary modules of the plurality of elementary modules in the stacking direction and is configured to transport the cooling flow so as to exchange heat by convection with said two elementary modules. Thus, a cathode feed channel may feed several elementary modules and/or a cooling channel may exchange heat with several elementary modules. The mass of the oxidant feed means and of the cooling means of the fuel cell is thus limited.

Moreover, the fuel cell preferably includes:
a plurality of cathode feed channels, each cathode feed channel being configured to feed at least one elementary module with cathode feed flow,
a cathode feed probe placed in a channel of the plurality of cathode feed channels and configured to measure at least one cathode feed property chosen from the humidity, the temperature and the pressure,
a cathode feed flow generator configured to generate the cathode feed flow to be transported in said channel or in another channel of the plurality of cathode feed channels, and
a unit for controlling said cathode feed flow generator, which is configured to regulate, as a function of the measurement of the cathode feed property, at least one parameter of said cathode feed flow to be transported in said channel and/or said cathode feed flow to be transported in the other channel.

The at least one parameter of said cathode feed flow may be chosen from the temperature, the pressure, the flow rate, the speed of the cathode feed flow at the cathode feed flow generator outlet, and combinations thereof.

Preferably, the fuel cell includes:
a plurality of cooling channels, each cooling channel being configured to transport a cooling flow so as to exchange heat by convection with at least one elementary module,
a cooling probe placed in a channel of the plurality of cooling channels and configured to measure at least one cooling property chosen from the humidity, the temperature and the pressure,
a cooling flow generator configured to generate the cooling flow to be transported in said channel or in another channel of the plurality of cooling channels, and
a unit for controlling said cooling flow generator, which is configured to regulate, as a function of the measurement of the cooling property, at least one parameter of said cooling flow to be transported in said channel and/or said cooling flow to be transported in the other channel.

In this way, the temperature of the oxidation units of each elementary module is regulated, for example, by means of a limited number of sensors, in particular by means of a single sensor.

The at least one parameter of said cooling flow may be chosen from the temperature, the pressure, the flow rate, the speed of the cooling flow at the cooling flow generator outlet, and combinations thereof.

Moreover, the fuel cell may include a sensor placed in an elementary module in fluid communication with the cathode feed channel in which is placed the cathode feed probe and/or which is capable of exchanging heat by convection with a cooling flow flowing in the cooling channel in which is placed the cooling probe, said sensor being configured to measure an electrical resistance chosen from an internal resistance of the cell, the polarization resistance of the cell, or the total resistance of the cell. Preferably, the unit for controlling said cathode feed flow generator is configured to regulate, as a function of the measurement of the cathode feed property and of the measurement of the electrical resistance, at least one parameter of said cathode feed flow to be transported in said channel and/or said cathode feed flow to be transported in the other channel, and/or the unit for controlling said cooling flow generator is configured to regulate, as a function of the measurement of the cooling property and of the measurement of the electrical resistance, at least one parameter of said cooling flow to be transported in said cooling channel and/or said cooling flow to be transported in the other cooling channel.

In one embodiment, the fuel cell includes at least one diaphragm and/or at least one flap configured to limit the flow rate at the inlet of the cathode feed channel and/or of the cooling channel. For example, in a variant in which the fuel cell is placed in a flying object, the air movements during a flight of the flying object may bring about the formation of spurious flows which may modify the behavior of the cell. In such an embodiment, one means for generating cathode feed flows and/or cooling flows may be the movement of the flying object. Preferably, all the flaps and/or diaphragms are controlled by a single flap and/or diaphragm control module configured to place the flaps and/or diaphragm in the same open or closed configuration. The flaps and/or diaphragms may all be placed facing a side face of the cell. In particular, the flaps and/or diaphragms placed facing the cooling channel apertures may be placed facing the same face as the flaps and/or diaphragms placed facing the cathode feed channel apertures. In one variant, flaps and/or diaphragms may be placed on other side faces, and notably on an opposite face.

As regards its dimensions, the cell may have a height of between 20 mm and 600 mm and/or a width of between 20 mm and 600 mm, and/or a depth of between 20 mm and 600 mm.

Finally, the mass of the fuel cell may be between 0.01 kg and 10 kg. The fuel cell is configured to generate an electric power of between 1 W and 50 kW.

Preferably, the cell has a power density per unit mass of between 100 $W.kg^{-1}$ and 5000 $W.kg^{-1}$.

The invention also relates to a process for manufacturing a fuel cell according to the invention, including a step of manufacturing at least one elementary module, preferably according to either of the first and second aspects of the invention, the step for manufacturing the elementary module including the attachment, preferably the bonding, of an anode block, respectively, of a cathode block, to an oxidation unit.

Preferably, at least two, preferably at least 10, elementary modules are manufactured, and the elementary modules are stacked on top of each other in a stacking direction.

Preferably, at least one adhesive composition is deposited on the anode block, respectively, on the cathode block, and/or on the oxidation unit, and the anode block, respectively, the cathode block is then assembled with the oxidation unit so as to form an attachment bridge rigidly attached to the anode block, respectively, to the cathode block, and to the oxidation unit.

The adhesive composition may have a liquid or solid form.

BRIEF DESCRIPTION OF THE DRAWINGS

Other features and advantages of the invention will also emerge on reading the detailed description that follows and from the attached drawing, in which.

DETAILED DESCRIPTION

In the various figures, identical references are used to denote identical or similar members.

Figure 1:
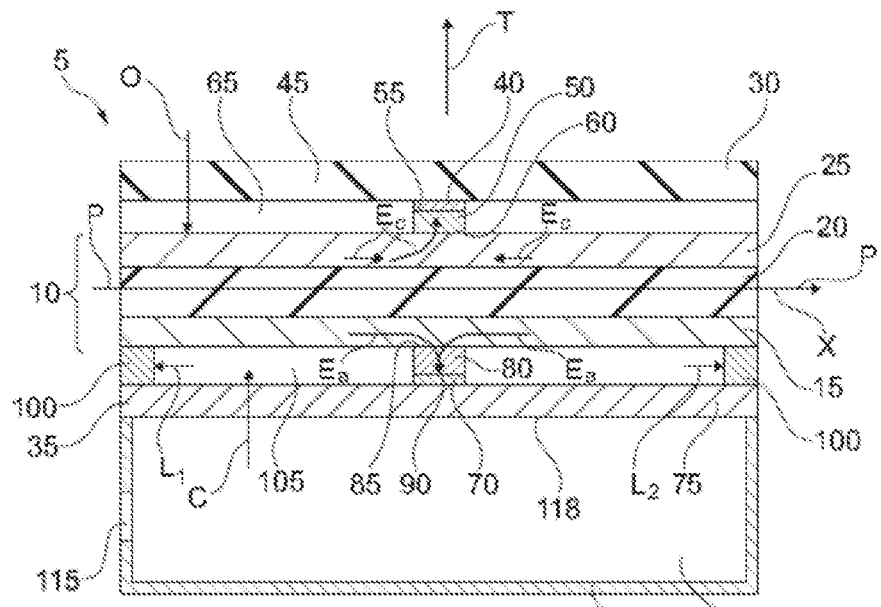
FIG. 1 schematically represents, in cross section view, an elementary module according to the invention, FIG. 2 schematically represents, in cross section view, another elementary module according to the invention.

The elementary module 5 of FIG. 1 extends in a longitudinal plane P including a longitudinal direction X. It includes an oxidation unit 10 formed from a stack constituted successively of an anode 15, of an electrolytic membrane 20 and of a cathode 25, all three each being in the form of a plate extending in a plane parallel to the longitudinal plane. The electrolysis unit is placed between an oxidant transporter support 30 and a fuel transporter support 35, each being in the form of a porous plate extending in a plane parallel to the longitudinal plane of the elementary module.

A cathode electron collector 40, in the form of a strip projecting in a transverse direction T relative to the longitudinal plane, is attached to the oxidant transporter support, thus defining with the oxidant transporter support a cathode block 45. It is attached to the cathode by means of a cathode conductive bridge 50 formed from an electrically conductive adhesive. The cathode conductive bridge extends in the transverse direction between two opposite faces 55 and 60, one of them 55 being in contact with the cathode electron collector, the other 60 being in contact with the cathode. Thus, the oxidation unit and the cathode block are attached to each other by bonding and electrically connected.

Moreover, the oxidant transporter support, the cathode electron collector, the cathode conductive bridge and the cathode define a cathode chamber 65. Thus, during functioning, the cathode feed flow, for example generated by a fan and transported in a cathode feed channel, as will be described hereinbelow, passes through the porous oxidant transporter support, as indicated by the arrow O to penetrate into the cathode chamber and come into contact with the cathode so as to ensure the oxidation reaction of the fuel. The cathode electrons resulting from the oxidation reaction which are formed at the cathode may be collected and then, as indicated by the arrow Ec, may then be transferred by means of the cathode collector bridge to the cathode electron collector.

An anode electron collector 70, in the form of a strip projecting in the transverse direction, is attached to the fuel transporter support 35, thus defining with the fuel transporter support an anode block 75. The anode electron collector is attached to the anode by means of an anode conductive bridge 80 formed from an electrically conductive adhesive. The anode conductive bridge extends in the transverse direction between two opposite faces 85 and 90, one of them 90 being in contact with the anode electron collector, the other 85 being in contact with the anode. Thus, the oxidation unit and the anode block are attached to each other by bonding. In addition, the anode electrons resulting from the oxidation reaction of the fuel, which are formed at the anode, may be collected and then, as indicated by the arrow Ea, may then be transferred by means of the anode conductive bridge to the anode electron collector.

In this way, the attachments by bonding of the anode and cathode blocks by means of the respective anode and cathode conductive bridges to the oxidation unit ensure the mechanical strength of the elementary module, without it being necessary to insert permanent compression means for this purpose.

Moreover, an anode leakproofing bridge 100, formed from a fuel-leaktight electrically insulating adhesive seal, is sandwiched between the anode block and the fuel transporter support and holds them a distance from each other, defining an anode chamber 105 extending in a plane parallel to the longitudinal plane. The anode leakproofing bridge forms a leakproofing seal extending between the faces facing the anode and the fuel transporter support, in a transverse direction relative to the longitudinal plane. The anode leakproofing bridge surrounds said anode chamber in a plane parallel to the longitudinal plane. Besides its leakproofing function described hereinbelow, it reinforces the mechanical strength of the elementary module, by adding an additional attachment between the anode block and the oxidation unit. During functioning, the attachment of the oxidation unit by means of the anode leakproofing bridge and the anode conductive bridge allows the elementary module to withstand the fuel pressure in the anode chamber, which is above atmospheric pressure.

Moreover, the elementary module includes a reservoir 108, defining an internal volume 110, including a filling orifice 115 for feeding the reservoir with fuel. The fuel transporter support moreover defines a wall 118 separating the anode chamber from the internal volume of the reservoir.

During functioning, a compressor can inject a fuel flow into the internal volume of the reservoir via the filling orifice, in which the fuel is thus stored. The anode feed flow containing the fuel then passes through the fuel transporter support, which is porous, and penetrates into the anode chamber where it flows, in a transverse direction relative to the longitudinal direction, until it comes into contact with the anode, as indicated by the arrow C. The anode leakproofing bridge limits the flow of the fuel flow in the chamber in any direction contained in the longitudinal plane, as indicated by the arrows $L_1$ and $L_2$, and thus reduces the leaks of fuel out of the anode chamber.

Figure 2:
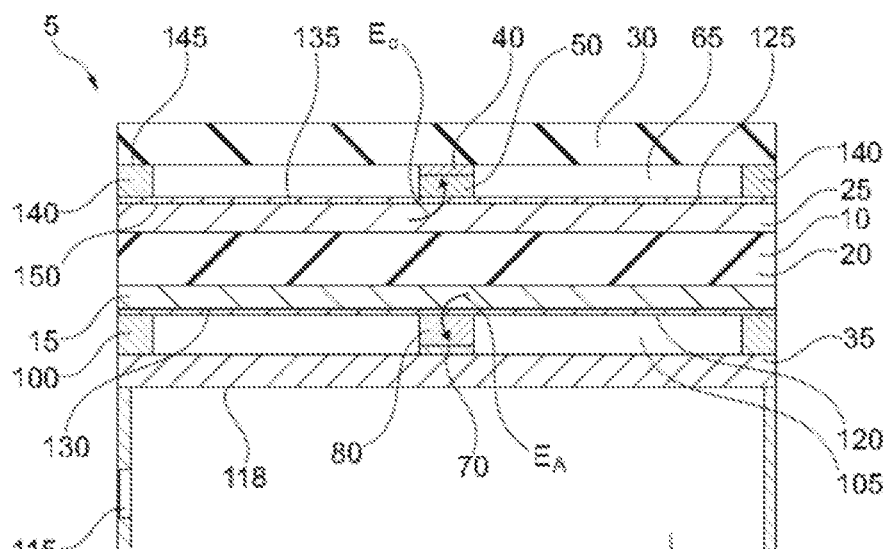

The elementary module of FIG. 2 differs from the elementary module of FIG. 1 in that an anode collecting layer 120 and a cathode collecting layer 125 are placed on the faces 130 and 135 of the anode and cathode, respectively, placed facing the anode and cathode chambers, respectively.

The anode and cathode collecting layers improve the collection of the anode and cathode electrons generated remotely from the anode and cathode electron collectors, respectively.

In order for the fuel and the oxidant to be able to come into contact with the anode and the cathode, respectively, the electron collecting layers may partially cover said faces of the anode and cathode and, for example, may be fuel-leaktight or oxidant-leaktight, respectively. In this variant, the fuel and the oxidant may come into contact with the anode and the cathode, respectively, in the zones of said faces of the anodes and cathodes that are not covered with the anode and cathode collecting layers, respectively. The anode and cathode collecting layers may also be in the form of a film that is porous with respect to the fuel and to the oxidant, respectively, and which covers, for example entirely, said faces of the anode and cathode, respectively.

In the example of FIG. 2, the anode conductive bridge 80 and the anode leakproofing bridge 100 are attached by bonding to the anode layer.

Moreover, to further reinforce the mechanical strength of the elementary module, the elementary module of FIG. 2 includes a cathode attachment bridge 140 formed from an electrically insulating adhesive, extending between two opposite faces of the cathode chamber in a transverse direction relative to the longitudinal plane, one of the faces 145 of the cathode attachment bridge being bonded to the oxidant transporter support, the other face 150 of said bridge being bonded to the cathode collecting layer 125.

Although this is not illustrated, the elementary module of FIG. 1 may include such a cathode attachment bridge bonded both to the fuel transporter support and to the cathode.

Figure 3:
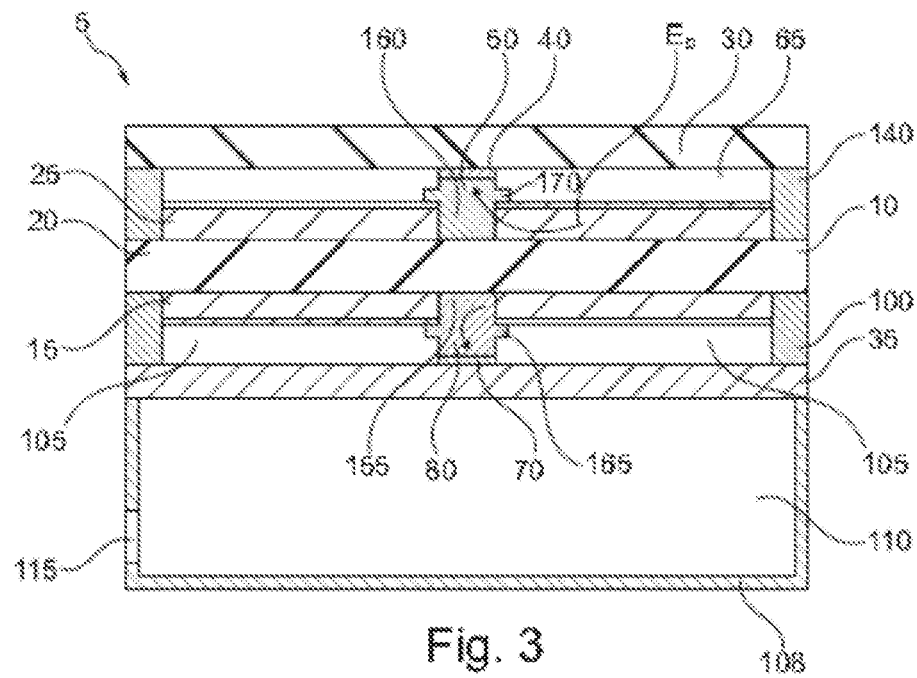
FIG. 3 schematically represents, in cross section view, another elementary module according to the invention.

The elementary module of FIG. 3 differs from the elementary module of FIG. 2 in that the anode, respectively, the cathode includes an anode window 155, respectively, a cathode window 160, passing through the anode, respectively, the cathode, in its thickness, and lying on the electrolytic membrane. The anode conductive bridge 80, respectively, the cathode conductive bridge 50 is housed in the anode window, respectively, in the cathode window, and is attached by bonding to the electrolytic membrane 10.

In the variant in which the mechanical connection between the anode, respectively, the cathode and the electrolytic membrane is weak, the mechanical strength of the elementary module is improved, the connections of the anode and cathode blocks, respectively, by means of the anode and cathode conductive bridges, respectively, with the oxidation unit being made directly with the electrolytic membrane.

The anode conductive bridge 80, respectively, the cathode conductive bridge 50 has a relief 165, respectively, 170 projecting longitudinally and being placed in contact with the anode collecting layer, respectively, with the cathode collecting layer. The relief of the anode conductive bridge, respectively, of the cathode conductive bridge places the anode, respectively, the cathode in electrical contact with the anode electron collector, respectively, with the cathode electron collector.

Figure 4:
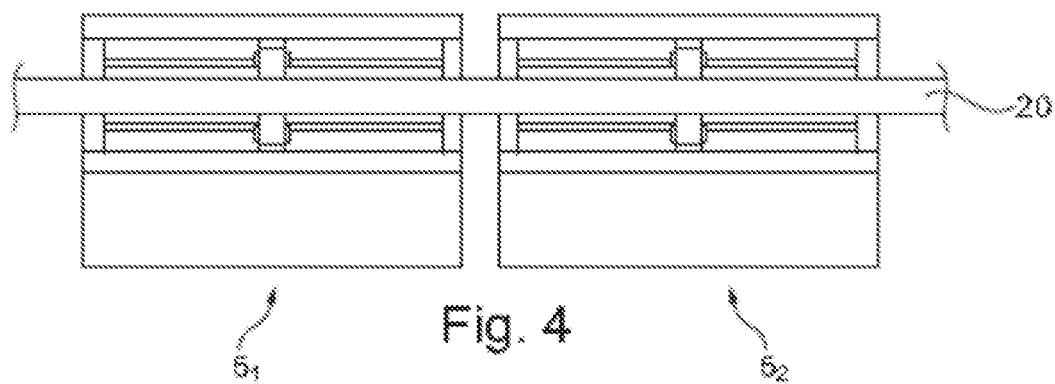
FIG. 4 schematically represents, in cross section vice, another elementary module according to the invention.

FIG. 4 illustrates an embodiment of the fuel cell including several elementary modules $5_1$, $5_2$ sharing the same electrolytic membrane 20. Relative to a cell constituted of two modules each placed on different electrolytic membranes, each of said modules being as illustrated in FIG. 3, the arrangement illustrated in FIG. 4 makes it possible to increase the voltage delivered by the cell for the same power generated. The fuel cell of FIG. 4 includes elementary modules as illustrated in FIG. 3, which may obviously be combined and/or replaced with one or more elementary modules, for example as illustrated in FIGS. 1 and 2. Moreover, in a variant not shown, the elementary modules may share the same fuel transporter support and/or the same insulating transporter support. They may or may not share the same reservoir.

Figure 5:
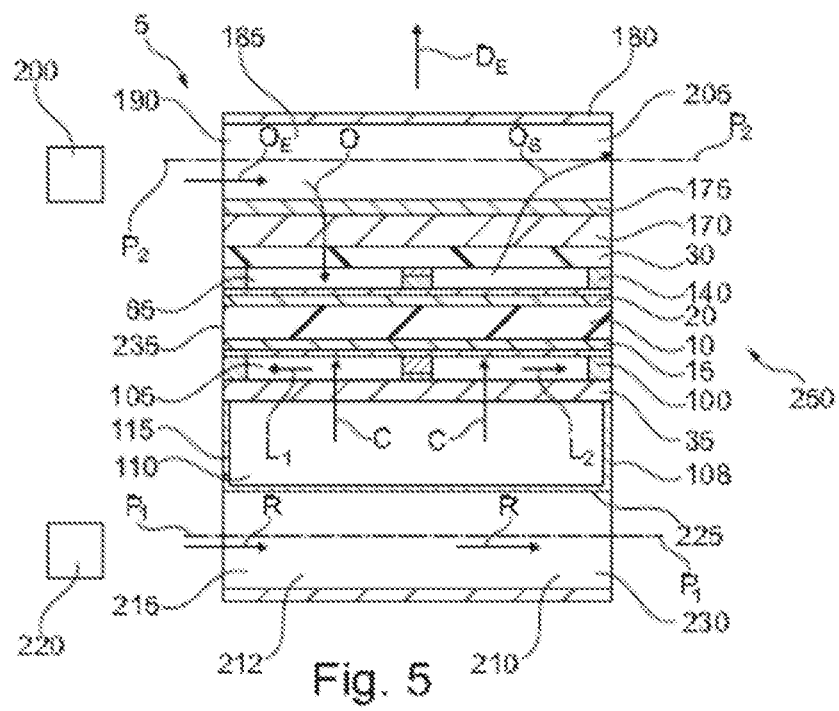
FIG. 5 schematically represents, in cross section view, another elementary module according to the invention.

FIG. 5 illustrates a fuel cell including an elementary module as illustrated in FIG. 2, also including a superposed porous gas diffusion layer 170 which is in contact with the face of the oxidant transporter support opposite the face that is facing the anode chamber. Moreover, the gas diffusion layer is placed between the oxidant transporter support and a porous grate 175 with which it is in contact.

The fuel cell of FIG. 5 also includes a first hollow tube 180, one wall of which is at least partially formed by the grate 175, which defines a cathode feed channel 185 for transporting a cathode feed flow including the oxidant. The hollow tube includes an inlet aperture 190 for the cathode feed flow, as indicated by the arrow $O_E$, which is placed facing a fan 200 that is capable of generating said cathode feed flow. The hollow tube moreover includes an outlet aperture 205, via which the cathode feed flow can escape, as indicated by the arrow $O_S$ after it has passed through the porous grate 175 and the gas diffusion layer and after having fed, as indicated by the arrow O, the cathode chamber 65 of the elementary module, and after having been charged with oxidation reaction products. In particular, in the case where the oxidant is dioxygen and the fuel is dihydrogen, the oxidation reaction produces water vapor which is evacuated from the anode chamber to the outlet aperture by the cathode feed flow, in the present case a flow of air.

The fuel cell also has a second hollow tube 210 placed such that the elementary module 5 is sandwiched between the first 185 and second 210 hollow tubes. The second hollow tube has a wall in common with the reservoir. It defines a cooling channel 212 having an inlet aperture 215 configured for the inlet of a cooling flow R including a heat transfer fluid such as air, placed facing a fan 220 configured to generate and distribute said cooling flow to said inlet aperture.

When it flows in the cooling channel as indicated according to the arrow R, the elementary module exchanges heat generated by the exothermic oxidation reaction by convection on the wall 225 common to the module and to the second hollow tube. The cooling flow thus heated flows to an outlet aperture 230 placed opposite the inlet aperture, via which it is evacuated from the fuel cell.

As may be seen in FIG. 5, in order to avoid any interaction between the cathode feed flow O and the cooling flow R, the cathode feed channel and the cooling channel extend in different planes $P_1$ and $P_2$ parallel to the longitudinal plane.

Moreover, in the example of FIG. 5, the fan for generating the cooling flow and the fan for generating the cathode feed flow including the oxidant are placed facing the same side face 235, parallel to the stacking direction $D_E$ of the fuel cell. As a variant, the fan for generating the cooling flow may be placed on the side face opposite the one to which the fan for generating the cathode feed flow is placed facing.

In a variant not shown, and notably when the cell is intended for generating an electric current within a limited operating temperature range, the cell may be free of means as described, for example, in FIG. 5, for cooling the cell by means of a cooling flow.

Figure 6:
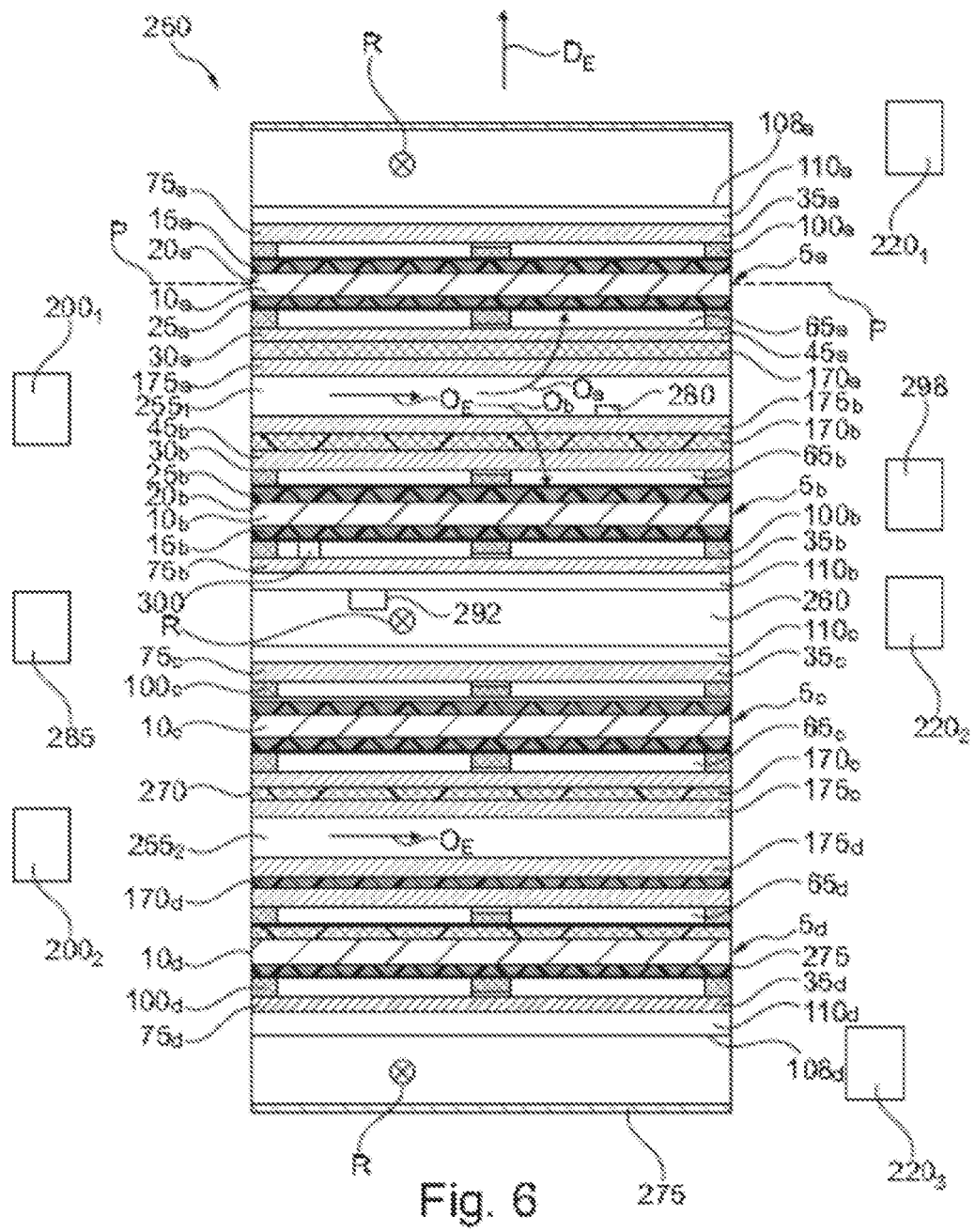
FIG. 6 schematically represents a fuel cell including a plurality of elementary modules according to the invention, in cross section view along the stacking direction of the elementary modules.

The fuel cell 250 of FIG. 6 includes a plurality of four elementary modules 5a-d stacked on each other in a stacking direction $D_E$.

Each elementary module of the plurality is identical to that illustrated in FIG. 5, with the exception that the apertures and outlets of the cooling channels are formed on faces perpendicular to those on which are formed the apertures and outlets of the cathode feed channels. The stacking direction $D_E$ is perpendicular to the longitudinal plane P of each elementary module.

The fuel cell is configured such that each pair of two consecutive elementary modules of the stack is such that said two elementary modules, for example 5a and 5b, are arranged head to tail relative to each other in the stacking direction.

The modules of the stack are electrically connected by means of an electrical circuit, not shown, connecting an anode electron collector of one elementary module to a cathode electron collector of an adjacent elementary module.

In the stack of FIG. 6, two consecutive elementary modules having cathode blocks placed facing each other are separated by a cathode feed channel $255_{1-2}$ extending in a transverse plane relative to the stacking direction. Thus, by means of a single cathode feed channel, the cathode chambers 65a-d of the two elementary modules are fed with a single cathode feed flow at the inlet O.

Moreover, two consecutive elementary modules whose anode blocks, for example 75b and 75c, are placed facing each other and are separated by a cooling channel 260 extending in a transverse plane relative to the stacking direction. Thus, by means of a single cooling channel, the two elementary modules 5b and 5c are cooled by convective exchange with the cooling flow R flowing in the channel.

In this way, the fuel cell 250 of FIG. 6 is configured such that the cathode feed channel and the cooling channel are placed a distance from each other and in alternance along the stacking direction $D_E$. In this way, the interactions between the cathode feed flow O and the cooling flow R are limited.

As regards the generation of the cathode feed flows and of the cooling flows, the fuel cell of FIG. 6 includes two cathode feed fans $200_{1-2}$ configured so as each to feed a respective cathode feed channel $255_{1-2}$ with associated cathode feed flows and three cooling fans $220_{1-3}$ configured so as each to feed a cooling channel with associated cooling flows. Moreover, the cathode feed fans and the cooling fans are placed facing side faces 270, 275 of the cell that are perpendicular to each other. In this way, the cathode feed flows and the cooling flows flow in respectively oblique flow directions. The interaction between said flows is limited, which optimizes the energy yield of the cell.

Moreover, the fuel cell illustrated in FIG. 6 includes a cathode feed probe 280 placed in one of the cathode feed channels to measure the temperature of the cathode feed flow in said channel. The cathode feed probe is electrically connected to a unit 285 for controlling the anode feed fans of the cell, via connection means not shown, said control unit being configured to regulate, as a function of the temperature measured by the cathode feed probe, for example, the flow rate of the cathode feed flow at the outlet of each of the cathode feed fans of the fuel cell.

In this way, by means of a single cathode feed probe, the flow rate of the cathode feed flows of the plurality of cathode feed channels of the cell can be easily regulated.

The fuel cell of FIG. 6 also includes a cooling probe 292 placed in one of the cooling channels consecutive to the cathode feed channel in which is placed the cathode feed probe, to measure the temperature of the cooling flow in said cooling channel. The cooling probe is electrically connected to a unit for controlling the cooling fans 298 of the fuel cell, via connection means not shown, said control unit being configured to regulate, as a function of the temperature measured by the cooling probe, for example, the flow rate of the cooling flow at the outlet of each of the cooling fans of the fuel cell.

In this way, by means of a single cooling probe, the flow rate of the cooling flows of the plurality of cooling channels of the cell can be easily regulated.

The fuel cell also includes a sensor 300 placed in an elementary module to measure, for example, the internal resistance of the elementary module. The sensor is connected to the units for controlling the cathode feed fan and cooling fan which are also each configured to regulate the flow rates of the cathode feed flow and the cooling flow as a function of the internal resistance measurement of the elementary module.

Figure 7:
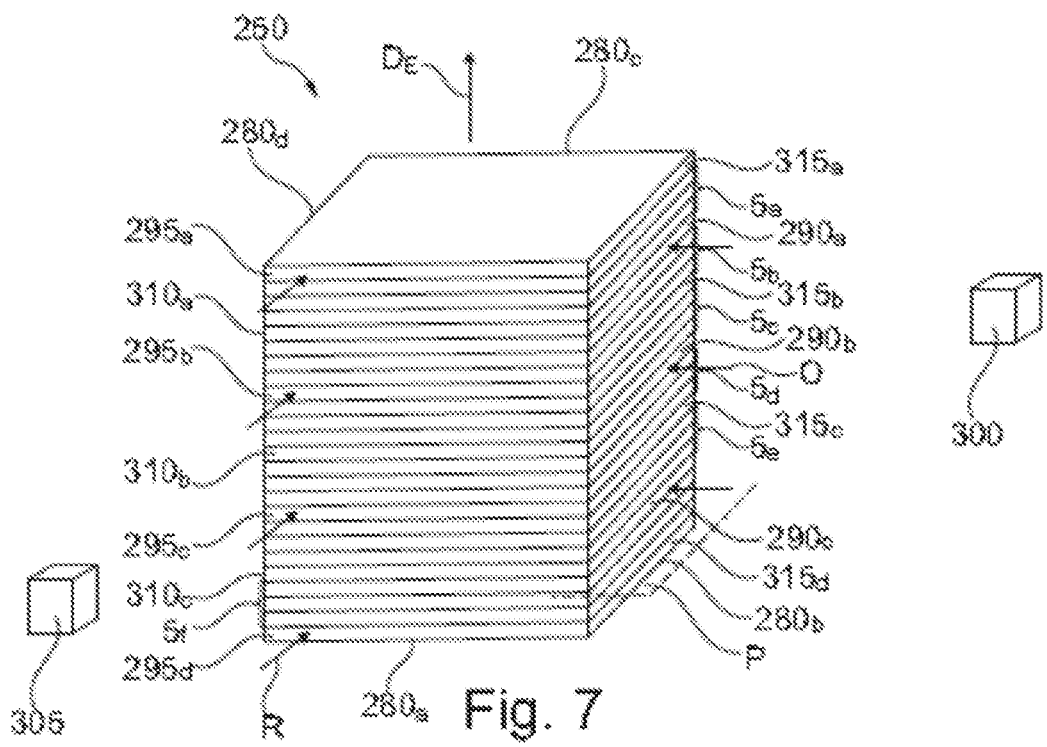
FIG. 7 represents a perspective variant of the fuel cells according to the invention.

FIG. 7 schematically shows a fuel cell 250 including six elementary modules 5a-f stacked in a stacking direction $D_E$, each elementary module being thin and extending in a longitudinal plane P normal to the stacking direction.

The elementary modules of the fuel cell are placed head to tail in pairs as in the example of FIG. 6.

The fuel cell of FIG. 7 is in the general form of a right slab having four side faces 280a-d on which emerge the inlets and outlets of the various cathode feed channels and cooling channels. In the example of FIG. 7, each cathode feed channel, respectively, each cooling channel has an inlet aperture 290a-c, respectively, 295a-d emerging on a side face facing a cathode feed fan 300, respectively, a cooling fan 305, and has outlet apertures 310a-c, respectively, 315a-d emerging on each of the other three side faces of the cell.

In the example of FIG. 7, one or more cathode feed fans 300 are placed facing a side face 280b perpendicular to another side face 280a towards which one or more cooling fans 305 are placed facing. Thus, the cathode feed flows O, on the one hand, and the cooling flows R, on the other hand, flow in the respective channels in substantially perpendicular directions.

Thus, although each cathode feed channel and each cooling channel have apertures on the four side faces 280a-d of the cell, interactions with harmful consequences for the functioning of the fuel cell, between cathode feed flows and cooling flows, are limited.

Figure 8:
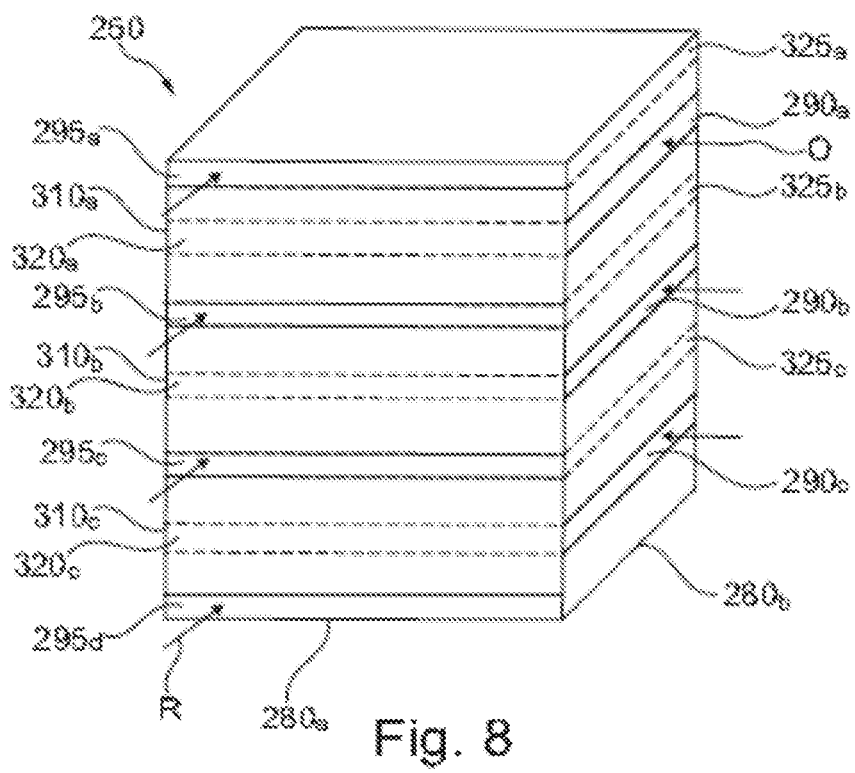
FIG. 8 represents another perspective variant of the fuel cells according to the invention.

The fuel cell of FIG. 8 is an improved and preferred embodiment of the fuel cell of FIG. 7, in which, for each cathode feed channel, respectively, each cooling channel, the apertures formed on the faces perpendicular to those on which is formed the inlet aperture of said channel are closed by means of side walls. Thus, the flow of the cathode feed flow, respectively, of the cooling flow takes place in the direction of the outlet aperture 310, respectively, 315 emerging on the side face of the cell opposite the side face on which emerges the inlet aperture 290, respectively, 295. In this way, the cathode feed flows and cooling flows flow in perpendicular directions and at different heights in the stacking direction and do not interact. Such an arrangement promotes the functioning of the fuel cell over an extended operating temperature range.

For example, to obtain the cell illustrated in FIG. 8, the side apertures of each cathode feed channel formed on one, or even on the two, side faces of the cell of FIG. 5, perpendicular to the side face on which is formed the inlet aperture for the cathode feed flow, may be closed so as to prevent the outlet of said flow, for example by means of masks referenced 320a-c between the dotted lines, for example made of polymer, notably formed from foam. Moreover, the side apertures of each cooling channel formed on one, or even on the two, side faces of the cell of FIG. 7, perpendicular to the side face on which is formed the inlet aperture for the cooling flow, may be closed so as to prevent the outlet of said flow, for example by means of masks referenced 325a-c between the dotted lines, for example made of polymer, notably formed from foam.

In this way, the cathode feed flows and cooling flows flow in perpendicular directions and do not interfere with each other.

In the example of FIG. 8, two consecutive elementary modules are placed head to tail. In a variant not shown, two consecutive elementary modules may be placed such that the anode block of the first elementary module is facing the cathode block of the second elementary module. Preferably then, in order to separate the cathode feed flow for feeding said cathode, from the cooling flow, a solid separating plate extending in a longitudinal direction is placed between the two consecutive elementary modules.

Moreover, the stack of FIG. 8 may be obtained by placing two cross braces between two consecutive elementary modules. The cross braces are, for example, solid bars. They are spaced apart from each other so as to form the side walls of a cathode feed channel or of a cooling channel.

Figure 9:
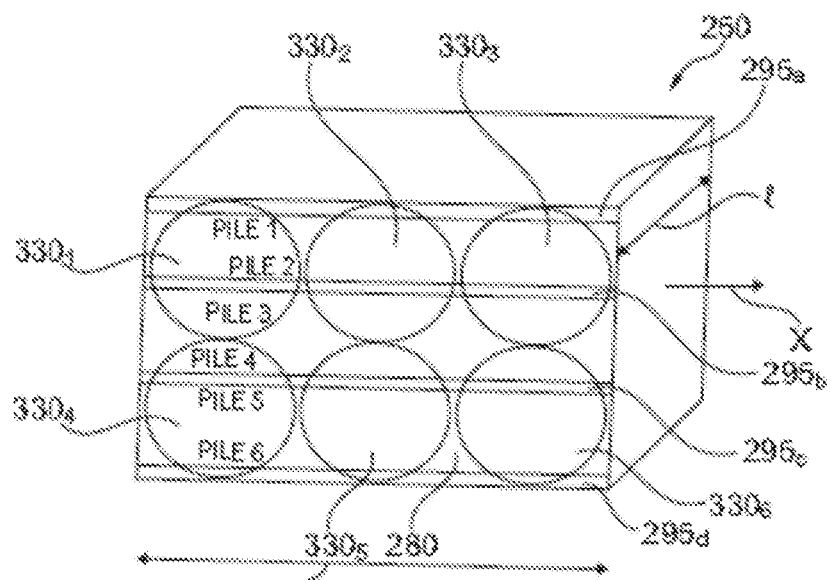
FIG. 9 represents another perspective variant of the fuel cells according to the invention.

The fuel cell of FIG. 9 differs from the fuel cell of FIG. 8 in that each module has a length L at least twice as long as the width l. In order to ensure optimum cooling of the elementary modules, several fans are placed in the longitudinal direction X facing the side face 280 on which emerge the apertures 295a-d of the cooling channels. The discs $330_{1-6}$ schematically indicate the portion of the side face onto which is directed the cooling flow.

Finally, none of the elementary modules described in FIGS. 1 to 4 and none of the fuel cells illustrated in FIGS. 5 to 9 includes means for compressing the plurality of elementary modules, such as clamping plates connected by compression tie rods.

EXAMPLE

Figure 10:
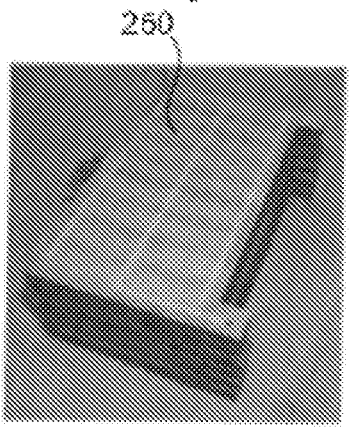
FIG. 10 is a photograph of a cell according to one embodiment of the invention.

A fuel cell, a photograph of which is shown in FIG. 10, is formed by a stack of 12 elementary modules, each in the form of a thin right slab with a length of 117 mm, a width of 74 mm and a thickness of 2 mm. This fuel cell is configured to oxidize dihydrogen as fuel with atmospheric dioxygen.

Each elementary module weighs 8 g and is capable of generating an electric power of 8 W. Two consecutive elementary modules are placed head to tail in the stacking direction and are spaced 1.2 mm apart, by means of a spacer formed by foam bars, the opposite faces of which, each in contact with one of said two consecutive modules, are covered with adhesive. The stack is in the form of a right slab, with a length of 117 mm, a width of 74 mm and a thickness of 45 mm.

The fuel cell has a volume of 0.4 liter and a mass of less than 150 g. It is capable of generating an electric power of 100 W and has a power density per unit mass of $0.67$ $W.g^{-1}$. It is moreover suitable for generating electrical energy over a temperature range of between −20° C. and 50° C. The fuel cell has an internal resistance of 175 $m\Omega.cm^2$, similar to that of a cell of the prior art including end clamping plates and having a lower power density per unit mass for the same generated power. This internal resistance value indicates that the collection of electrons and the electrical connection of the elementary modules is of good quality.

Moreover, the pressure resistance measurements indicate that the fuel cell can withstand a maximum dihydrogen pressure of 3 bar in the anode chamber of each elementary module. In addition, as regards the leaktightness of the anode chamber, the measurements of leaktightness by infiltration of helium indicate that the rate of leakage is low, less than 0.1 $cm^3/min$ For comparative purposes, the performance qualities of the present fuel cell may be compared with a fuel cell formed from a stack of modules compressed by end plates, sold by the company Horizon FC. This cell functions within a lower temperature range of between 0° C. and 40° C. and is capable of generating a power of 200 W. However, it has a mass of 470 g and thus a low power density per unit mass equal to 0.42 $W.g^{-1}$ compared with the fuel cell of the invention.

Needless to say, the invention is not limited to the embodiments and examples described above.

For example, notably in the variant in which the cathode feed channel and/or the cooling channel have bent shapes, for example a coil or a plurality of parallel tubes, the cell may include a compressor, a distribution channel being connected to the compressor, the compressor being configured to distribute a cathode feed flow and/or a cooling flow at the inlet of the cathode feed channel and/or of the cooling channel, respectively.

Moreover, preferably, the cooling flow may include a heat transfer fluid other than air, for example a liquid, for example water or an oil.

Moreover, the fuel is not limited to dihydrogen. It may also be an alkane chosen, for example, from methane, propane, butane and mixtures thereof, or an alcohol in vapor form chosen, for example, from ethanol, methanol and mixtures thereof. The oxidant is not limited to dioxygen. It may also be a gas including dioxygen, for example air, or a mixture constituted of dioxygen and dinitrogen.

Finally, the terms "comprising a", "containing a" and "including a" are understood as equivalently meaning, respectively, "comprising at least one", "containing at least one" and "including at least one".

The invention claimed is:

1. A fuel cell including a plurality of elementary modules stacked on each other in a stacking direction,
at least one of the elementary modules of the plurality including:
   an oxidation unit configured to generate electrons by means of the oxidation of a fuel with an oxidant the oxidation unit including an anode and a cathode sandwiching an electrolytic membrane,
   an anode block including a fuel transporter support suitable for transporting an anode feed flow containing the fuel to an anode chamber, and an anode electron collector attached to the fuel transporter support,
   a cathode block including an oxidant transporter support suitable for transporting a cathode feed flow containing the oxidant to a cathode chamber, and a cathode electron collector attached to the oxidant transporter support,
   the at least one elementary module being configured so as to define the anode chamber between the oxidation unit and the fuel transport support, and the cathode chamber, between the oxidation unit and the oxidant transporter support,
   the at least one elementary module being such that, prior to the assembly of the at least one elementary module in the plurality of elementary modules of the fuel cell, the anode block is attached to the oxidation unit, and the cathode block is attached to the oxidation unit.

2. The fuel cell as claimed in claim 1, in which each elementary module extends in a longitudinal plane perpendicular to the stacking direction.

3. The fuel cell as claimed in claim 2, in which the anode block and the oxidation unit are attached by bonding and electrically connected to each other by means of an anode conductive bridge, containing an electrically conductive adhesive in which the cathode block and the oxidation unit are attached by bonding and electrically connected to each other by a cathode conductive bridge containing the electrically conductive adhesive.

4. The fuel cell as claimed in claim 3, in which the anode conductive bridge and the anode electron collector, respectively, the cathode conductive bridge and the cathode electron collector are both attached by bonding and electrically connected to each other.

5. The fuel cell as claimed in claim 1, in which the oxidation unit and the fuel transporter support are both attached by bonding to each other and electrically insulated from each other by means of an anode leakproofing bridge containing a fuel-leaktight electrically insulating adhesive, the anode leakproofing bridge being configured so that the anode feed flow transported to the anode chamber flows essentially directly from the fuel transporter support to the anode.

6. The fuel cell as claimed in claim 1, being free of means for compressing the plurality of elementary modules.

7. The fuel cell as claimed in claim 1, in which the elementary modules are electrically connected together in parallel or in series.

8. The fuel cell as claimed in claim 1, in which two consecutive elementary modules are placed head to tail in the stacking direction.

9. The fuel cell as claimed in claim 1, the cell being configured to define at least one cathode feed channel configured to feed the at least one elementary module with a cathode feed flow containing the oxidant, and at least one cooling channel configured to transport a cooling flow including a heat transfer fluid so as to exchange heat by convection with the at least one elementary module.

10. The fuel cell as claimed in claim 9, in which the at least one elementary module is placed between the cathode feed channel and the cooling channel.

11. The fuel cell as claimed in claim 9, in which the cathode feed channel extends in an extension direction perpendicular to the direction in which cooling the channel extends, and/or the plane in which the cathode feed channel extends is different and parallel to the plane in which the cooling channel extend.

12. The fuel cell as claimed in claim 9, in which the cathode feed channel is placed between the respective cathode blocks of at least two consecutive elementary modules of the plurality of elementary modules in the stacking direction, and is configured to transport the cathode feed flow to the oxidant transporter support of each of said two respective elementary modules, and/or
the cooling channel is placed between at least two consecutive elementary modules of the plurality of elementary modules in the stacking direction and is configured so as to transport the cooling flow so as to exchange heat by convection with said two elementary modules.

13. The fuel cell as claimed in claim 9, in which:
the cathode feed channel has at least one inlet aperture, respectively, at least one outlet aperture, for the flow at the cell inlet, respectively, at the cell outlet of the cathode feed flow, and
the cooling channel has at least one inlet aperture, respectively, at least one outlet aperture, for the flow at the cell inlet, respectively, at the cell outlet of the cooling flow,
the inlet apertures and outlet apertures of said cathode feed channels and cooling channels being configured so that the cell inlet and outlet cathode feed flows flow in at least one direction perpendicular to the at least one direction of flow of the cell inlet and outlet cooling flows, and/or
the inlet apertures and outlet apertures of said cathode feed channel and cooling channel are configured so that the direction(s) of flow of the cell inlet and outlet cathode feed flows and the direction(s) of flow of the cooling flows are contained in different and parallel planes.

14. The fuel cell as claimed in claim 9, including:
a plurality of cathode feed channels, each cathode feed channel being configured to feed at least one elementary module with cathode feed flow,
a cathode feed probe placed in a channel of the plurality of cathode feed channels and configured to measure at least one cathode feed property chosen from the humidity, the temperature and the pressure,
a cathode feed flow generator configured to generate the cathode feed flow to be transported in said channel or in another channel of the plurality of cathode feed channels, and
a unit for controlling said cathode feed flow generator, which is configured to regulate, as a function of the measurement of the cathode feed property, at least one parameter of said cathode feed flow to be transported in said channel and/or said cathode feed flow to be transported in the other channel, and/or
a plurality of cooling channels, each cooling channel being configured to transport a cooling flow so as to exchange heat by convection with at least one elementary module,
a cooling probe placed in a channel of the plurality of cooling channels and configured to measure at least one cooling property chosen from the humidity, the temperature and the pressure,
a cooling flow generator configured to generate the cooling flow to be transported in said channel or in another channel of the plurality of cooling channels, and
a unit for controlling said cooling flow generator, which is configured to regulate, as a function of the measurement of the cooling property, at least one parameter of said cooling flow to be transported in said channel and/or said cooling flow to be transported in the other channel.

15. The fuel cell as claimed in claim 14, including a sensor placed in an elementary module in fluid communication with the cathode feed channel in which is placed the cathode feed probe and/or which is capable of exchanging heat by convection with a cooling flow flowing in the cooling channel in which is placed the cooling probe, said sensor being configured to measure an electrical resistance chosen from an internal resistance of the elementary module, the polarization resistance of the elementary module, or the total resistance of the elementary module,
the unit for controlling said cathode feed flow generator being configured to regulate, as a function of the measurement of the cathode feed property and of the measurement of the electrical resistance, at least one parameter of said cathode feed flow to be transported in said cathode feed channel and/or said cathode feed flow to be transported in the other cathode feed channel, and/or
the unit for controlling said cooling flow generator being configured to regulate, as a function of the measurement of the cooling property and of the measurement of the electrical resistance, at least one parameter of said cooling flow to be transported in said cooling channel and/or said cooling flow to be transported in the other cooling channel.

16. A process for manufacturing a fuel cell as claimed in claim 1, including a step of manufacturing at least one elementary module including a step to attach the anode block to the oxidation unit and a step to attach the cathode block to the oxidation unit.

17. The process as claimed in claim 16, in which at least two elementary modules are manufactured, and the elementary modules are stacked on top of each other in a stacking direction.

18. The process as claimed in claim 16, in which at least one adhesive composition is deposited on the anode block, and/or on the oxidation unit, and the anode block is then assembled with the oxidation unit so as to form an adhesive attachment bridge rigidly attached to the anode and to the oxidation unit, in which at least one adhesive composition is deposited on the cathode block and/or on the oxidation unit, and the cathode block is then assembled with the oxidation unit so as to form an adhesive attachment bridge rigidly attached to the cathode block and to the oxidation unit.

* * * * *